United States Patent

Mathewson

[11] Patent Number: 5,184,234
[45] Date of Patent: Feb. 2, 1993

[54] STACKED LCD COLOR PROJECTOR WITH EQUAL PATH LENGTHS

[75] Inventor: Christopher W. Mathewson, Rochester, N.Y.

[73] Assignee: Sayett Group, Inc., Rochester, N.Y.

[21] Appl. No.: 764,145

[22] Filed: Sep. 20, 1991

[51] Int. Cl.⁵ ................................ G02F 1/13
[52] U.S. Cl. ........................ 359/53; 359/40; 359/71
[58] Field of Search .......... 359/53, 40, 49, 63, 359/71; 353/30, 31, 37; 358/60

[56] References Cited

U.S. PATENT DOCUMENTS

| | | | |
|---|---|---|---|
| 4,448,823 | 5/1984 | Clifford | 359/71 |
| 4,690,526 | 9/1987 | Ledebuhr | 359/71 |
| 4,786,146 | 11/1988 | Ledebuhr | 359/70 |
| 4,904,061 | 2/1990 | Aruga | 359/40 |
| 5,022,750 | 6/1991 | Flasck | 353/30 |
| 5,075,798 | 12/1991 | Sonehara et al. | 353/31 |

Primary Examiner—William L. Sikes
Assistant Examiner—Huy K. Mai
Attorney, Agent, or Firm—Cumpston & Shaw

[57] ABSTRACT

Display apparatus for forming an image from a plurality of image modulators located at different distances from an image surface includes illumination means for forming an illumination beam, a plurality of image forming modulators disposed at different distances from the image surface, for forming a composite image on the image surface, path length correcting means disposed between the plurality of image forming modulators and the image surface, for equalizing the optical path lengths between the image forming modulators and the image surface, so that the composite image can be focused.

25 Claims, 1 Drawing Sheet

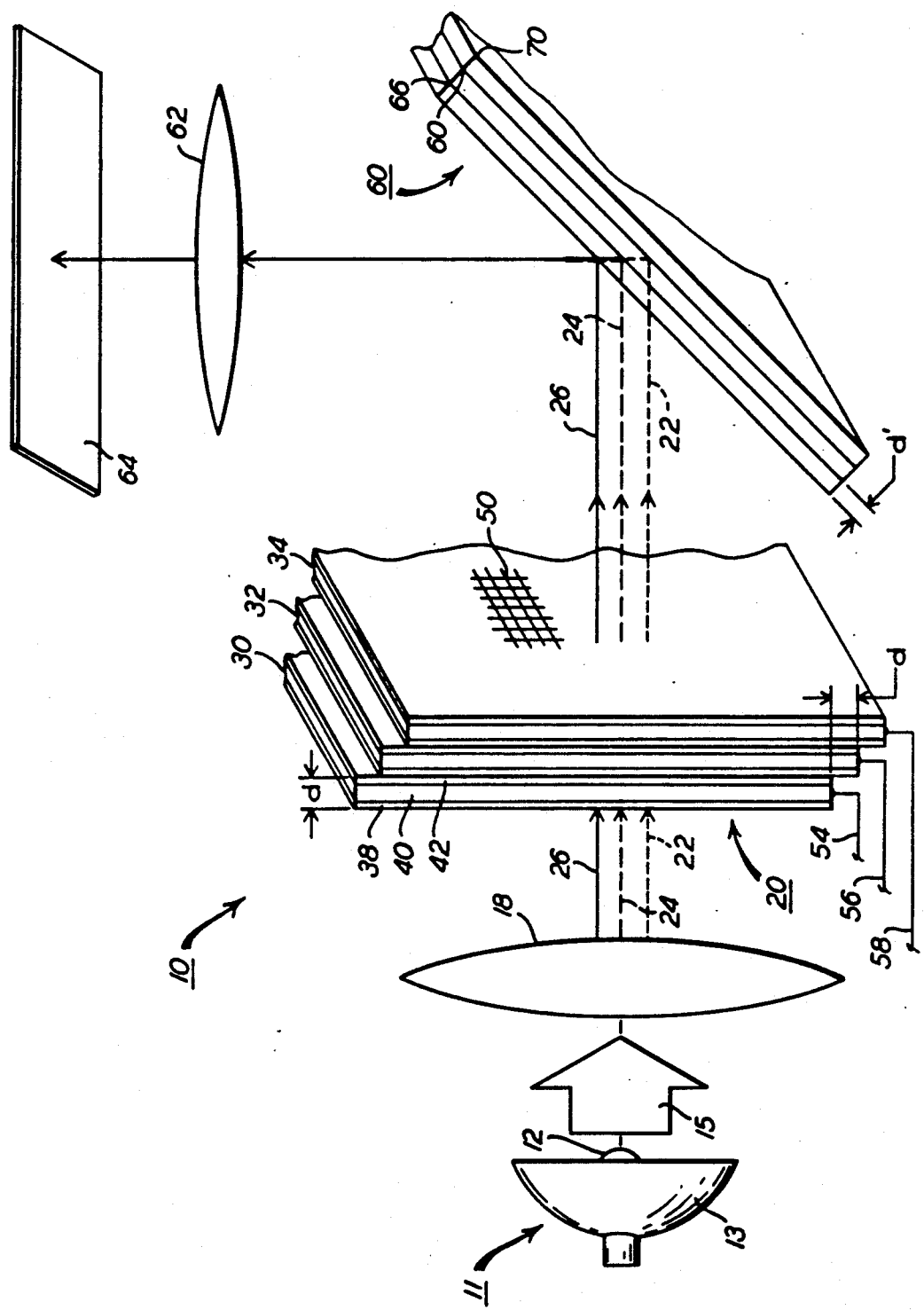

STACKED LCD COLOR PROJECTOR WITH EQUAL PATH LENGTHS

This invention relates generally to image forming apparatus, and more particularly to a liquid crystal display device having a single light source, a plurality of liquid crystal display panels and an optical path length corrector for improving the focus of the device.

Liquid crystal display panels have a number of advantages that make them useful in optical projectors, especially projectors for displaying computer generated images and portable projectors. Typically, a liquid crystal based display device may include an illumination source, a plurality of liquid crystal display panels arranged in a stack, and focusing optics for imaging a composite display generated by the panels on an image surface. One or more mirrors may be provided in the illumination path of such a projector for changing the direction of an illumination beam created by the illumination source, to make the display device more compact.

Oftentimes, a color display is produced by a stack of three liquid crystal panels, each forming an essentially monochromatic image from an array of separately selectable pixels. For example, three LCD panels can be arranged to affect the primary additive or subtractive colors, as the case may be, with each panel affecting one color, and the corresponding pixels of each of the LCD panels arranged to be coincident with respect to the light beam, so that the image is a composite of the images formed by the three panels.

The above arrangement has a significant limitation. Although liquid crystal display panels can be made relatively thin, the stacked arrangement of the panels produces a device in which the distance from the image planes of the panels to the image surface is slightly different for the three colors. Thus, it is not possible to precisely focus the three images at the same time, and a display is produced that is not as sharp as would be desirable. Arrangements are known that avoid this problem by creating three separate light paths of equal length, but such arrangements are complex.

It is an object of this invention to provide a configuration for a liquid crystal display based projection device of the type described above, in which a pathlength corrector is introduced between the panels and the display surface, for equalizing the path lengths from the individual panels to the surface, so that the images formed at image planes created by stacked liquid crystal displays can all be focused on the display surface.

Briefly stated, and in accordance with a presently preferred aspect of this invention, display apparatus for forming an image from a plurality of image modulators located at different distances from an image surface includes illumination means for forming an illumination beam, a plurality of image forming modulators disposed at different distances from the image surface, for forming a composite image on the image surface, path length correcting means disposed between the plurality of image forming modulators and the image surface, for equalizing the optical path lengths between the image forming modulators and the image surface, so that the composite image can be focused.

In accordance with another aspect of this invention, display apparatus includes illumination means for creating an illumination beam;

first modulation means in the illumination beam having an array of modulation sites for forming an image;

second modulation means in the illumination beam having an array of modulation sites for forming a second image offset from the array of modulation sites of the first modulation beams by an offset distance, the first and second modulation means being separated by a separation distance along the illumination beam; and distance compensating means in the illumination beam for compensating for the separation distance and permitting a focused image to be formed on an image surface.

In accordance with a presently preferred embodiment of this invention, the compensating means comprises a multi-surface mirror having a plurality of reflecting surfaces in the illumination path, the effective separation of the surfaces being selected to compensate for the separation between the modulating devices to equalize the path lengths.

In accordance with a presently preferred embodiment of this invention, a color display is provided having a plurality of stacked liquid crystal display panels each provided with selective polarizers for forming an LCD panel assembly, such that each liquid crystal display panel assembly only affects a selected band of spectral energy, for example, red, green or blue, while passing the remaining spectral energy bands unaffected. Each liquid crystal display assembly is arranged with a multiplicity of pixels in a matrix format, and the three LCD panels each have their pixels arranged in the same manner so that each image pixel is a composite of the pixels of the three panels. The panels are preferably displaced from one another in a direction parallel to their surfaces by a distance equal to the thickness of the panels plus any spacing between adjacent panels. A dichroic mirror assembly is arranged in the illumination path of the display apparatus at a 45° angle or other suitable angle, with respect to the liquid crystal display panels. The layers of the dichroic mirror assembly are selected to selectively reflect the images created by the red, green and blue panels respectively. The selectively reflecting surfaces of the dichroic mirror assembly are spaced at a distance equal to $d/2\sqrt{2}$, where d is the spacing between adjacent LCD panels measured along the optical path. The dichroic mirror assembly is selected such that the first dichroic mirror surface reflects light modulated by the liquid crystal display panel that is most remote from the mirror assembly, and passes the remainder of the light beam substantially unaffected.

The second dichroic mirror surface is selected to reflect the image created by the middle liquid crystal display panel, and to pass at least the spectral band that corresponds to the last liquid crystal display panel. The second dichroic mirror surface is spaced from the first by an amount equal to $d/2\sqrt{2}$, where d is the distance from the first to the second liquid crystal display panel.

The final reflecting surface can be a mirror that will reflect all spectral energy, though only the image formed by the third liquid crystal display panel should reach this surface. The last mirror is spaced from the second mirror by a distance equal to $d/2\sqrt{2}$, where d is the distance between the second and third liquid crystal display panels.

The system described above provides a composite image at an image plane, which is made up of images formed by each of three stacked liquid crystal display panels, which are effectively located the same distance from the image surface, so that the three images can simultaneously be focused on the image surface by the focusing lens.

The novel aspects of the invention are set forth with particularity in the appended claims. The invention itself, together with further objects and advantages thereof maybe more fully appreciated by reference to the following detailed description of a presently preferred embodiment of the invention, taken in connection with the accompanying drawing, in which:

the single figure is a diagrammatic view of a liquid crystal display apparatus in accordance with the invention.

Referring now to FIG. 1, a display apparatus 10 in accordance with this invention is illustrated diagrammatically. A source of illumination such as a projection lamp 12 preferably having a reflector 13 produces an illumination beam 15 along an axis of the lamp. A preferably columnnating lens 18 is disposed in the beam for providing a suitable beam for uniformly illuminating the stacked liquid crystal display panels 20. For purposes of better understanding the invention, although the beam is a polychromatic beam or a beam of white light, the red, green and blue components of the beam are illustrated by three rays, 22, 24, and 26 respectively, both entering and leaving the stack of liquid crystal display panels. The stack of panels includes three liquid crystal display panel assemblies, 30, 32, and 34, each assembly including an input polarizer 38, a layer of liquid crystal material 40, and an output polarizer 42. It will be understood that some embodiments of the invention may incorporate liquid crystal display assemblies that differ from those shown, for example, LCD assemblies that include one or more filters, assemblies that combine filters and polarizers, and assemblies that combine the physically adjacent filters of adjacent assemblies into a single element, to reduce the number of elements forming the assemblies, and consequently the complexity and cost thereof.

Each of the liquid crystal display assemblies includes a multiplicity of pixel elements 50, pixels, arranged in a matrix of rows and columns for forming an image in the illumination beam. Only a small portion of the matrix pixels is illustrated for simplicity. Each of the liquid crystal display assemblies is connected by conventional conductive cables 54, 56, 58, or the like, to a source of driving signals (not shown) for selectively energizing the panels, and more specifically the individual pixels thereof, to produce a desired image. Which pixels and which panels are energized depends upon the nature of the image and the color thereof, and in general, one pixel in each panel contributes to the formation of each pixel in the output display.

In accordance with this invention, the panels have a thickness d which for simplicity is illustrated as being uniform from one panel to the other, and which also represents the spacing between the panels, because the panels are positioned directly adjacent one another. The relative thickness of the elements of the liquid crystal display panels is greatly exaggerated in the drawing. The actual thickness of the liquid crystal layer is on the order of 5 to 10 microns. The thickness of the polarizers and/or filters in combination with the glass is much greater, on the order of 0.15 inches. Thus the spacing between the panels is much larger than the thickness of the liquid crystal material, and accordingly the planes at which the illumination beam is modulated by the three panels are effectively separated by the thickness of the three panels. For convenience, we have assumed a uniform thickness and spacing d for all three of the panels. The panels are offset or staggered with respect to one another, in a direction parallel to the panel surfaces so that the three pixels, one on each panel, that contribute to each pixel in the displayed image, are not in line. The portion of the illumination beam corresponding to each of the component pixels of one pixel of the displayed image are indicated by the solid dashed and finely dashed lines exiting from the stack of liquid crystal panels. In accordance with this embodiment of the invention, these pixels are offset by a distance d equal to the spacing d between the panels.

Path length compensating means in the form of a stack 60 of dichroic mirrors is arranged at a 45° angle with respect to the illumination beam, to reflect the beam towards a projection lens 62 and a display screen 64. The lens 62 and screen 64 are conventional, and the single element lens 62 is merely representative of a conventional multi-element display lens. The display panel 64 may be a front or rear projection panel, or any other panel or device for receiving and displaying an image.

The dichroic mirror assembly 60 includes three reflecting surfaces 66, 68, 70 separated by a thickness $d''$ equal to $d/2\sqrt{2}$ for the case of a dichroic mirror assembly disposed at an angle of 45°. The dichroic mirror assembly includes a first surface 66 for reflecting the image formed by the first liquid crystal display panel 30, and passing the images formed by the second and third panels 32, 34. The second dichroic mirror surface 68 is selected to reflect the image formed by the second liquid crystal display panel 32, and to pass at least the image formed by the third panel 34. Finally, the third dichroic mirror surface 70 is preferably a plane mirror that reflects all light. However, it will be understood that only the image formed by the third liquid crystal display panel 34 should be expected to reach the third reflective surface 70. The spacing of the first, second, and third dichroic reflective surfaces produces a compensation in path length, such that the first, second, and third images formed by the first, second and third liquid crystal display panels respectively are all effectively located at the same focal plane. That is, the image from the first panel which is furthest from the projection lens 13 is reflected from the front surface of the dichroic mirror assembly, while the image formed by the third liquid crystal display panel travels an additional distance $2d$ in the dichroic mirror assembly, and thus is effectively located at the same focal plane as the first image. The image formed by the second liquid crystal display panel travels at a compensating distance d, and consequently all three images are effectively formed at the same plane.

While the invention has been described in connection with a presently preferred embodiment thereof, those skilled in the art will recognize that many modifications and changes may be made therein, without departing from the true spirit and scope of the invention, which accordingly is intended to be defined solely by the appended claims.

What is claimed is:

1. Display apparatus comprising:
   illumination means for creating an illumination beam;
   first modulation means in the illumination beam having an array of modulation sites for forming an image;

second modulation means in the illumination beam having an array of modulation sites for forming a second image offset from the array of modulation means separated by a separation distance along the illumination beam;

path length compensating means in the illumination beam.

2. The display apparatus of claim 1 in which the first modulation means comprises a liquid crystal display panel.

3. The display apparatus of claim 2 in which the second modulation means comprises a second liquid crystal display panel arranged in a stack with the firs liquid crystal display panel, the first and second liquid crystal display panels each having a thickness d.

4. The display apparatus of claim 1 in which the path length compensating means comprises multi surface dichroic mirror means.

5. The display apparatus of claim 4 in which the multi surface dichroic mirror means comprises a first dichroic reflecting surface for reflecting an image created by the first modulation means and a second dichroic reflecting surface spaced from the first dichroic reflecting surface for reflecting an image formed by the second modulation means.

6. The display apparatus of claim 1 further comprising third modulation means in the illumination beam having an array of modulation sites for forming a second image offset from the array of modulation sites of the second modulation means by a second offset distance, the second and third modulation means separated by a second separation distance d along the illumination beam.

7. The display apparatus of claim 6 in which the first modulation means comprises a liquid crystal display panel.

8. The display apparatus of claim 7 in which the second modulation means and third modulation means comprises second and third liquid crystal display panels respectively, arranged in a stack with the first liquid crystal display panel, the first, second, and third liquid crystal display panels having the same thickness d.

9. The display apparatus of claim 6 in which the path length compensating means comprises multi surface dichroic mirror means.

10. The display apparatus of claim 9 in which the multi surface dichroic mirror means comprises a first dichroic reflecting surface for reflecting an image created by the first modulation means, a second dichroic reflecting surface spaced from the firs dichroic reflecting surface for reflecting an image formed by the second modulation means, and a third reflecting surface spaced from the second dichroic reflecting surface.

11. The display apparatus of claim 10 in which the first modulation means is adapted to form a blue image, the second modulation means is adapted to form a green image, and the third modulation means is adapted to form a red image.

12. The display apparatus of claim 11 in which the dichroic mirror assembly comprises a blue dichroic surface, a green dichroic surface spaced from the blue dichroic surface, and a mirror surface spaced from the green dichroic surface.

13. The display apparatus of claim 12 in which the liquid crystal display panels are spaced apart by a distance d measured along the illumination beam, and in which the first, second, and third reflecting surfaces of the dichroic mirror assembly are spaced apart by a distanced such that the image formed by the third modulation means travels a distance d further than the image formed by the second modulation means, which in turn travels a distance d further than the image formed by the first modulation means.

14. The display apparatus of claim 13 in which the dichroic mirror assembly is arranged at an angle of 45° relative to the illumination beam.

15. The display apparatus of claim 14 in which the first, second and third surfaces are spaced apart by a distance $d = d/2\sqrt{2}$.

16. Display apparatus for forming an image from a plurality of image modulators located at a different distance from an image surface, comprising:

illumination means for forming an illumination beam;

a plurality of image forming modulators disposed at difference distances from the image surface, for forming a composite image on the image surface;

path length correcting means disposed between the plurality of image forming modulators and the image surface for equalizing the optical path lengths between the image forming modulators and the image surface, so that the composite image can be focused.

17. The display apparatus of claim 16 in which the plurality of image forming modulators comprises a plurality of liquid crystal display panels.

18. The display apparatus of claim 17 in which plurality of liquid crystal display panels comprise first, second and third liquid crystal display panels respectively, arranged in a stack with the first liquid crystal display panel, the first, second, and third liquid crystal display panels each having a thickness d.

19. The display apparatus of claim 18 in which the path length compensating means comprises multi-surface dichroic mirror means.

20. The display apparatus of claim 19 in which the multi surface dichroic reflecting surface for reflecting an image created by a first one of the plurality of modulators, a second dichroic reflecting surface spaced from the first dichroic reflecting surface for reflecting an image formed by a second one of the plurality of modulators, and a third reflecting surface spaced from the second dichroic reflecting surface.

21. The display apparatus of claim 20 in which the first modulator is adapted to form a blue image, the second modulator is adapted to form a green image, and the third modulator is adapted to form a red image.

22. The display apparatus of claim 21 in which the dichroic mirror assembly comprises a blue dichroic surface, a green dichroic surface spaced from the blue dichroic surface, and a mirror surface spaced from the green dichroic surface.

23. The display apparatus of claim 18 in which the liquid crystal display panels are spaced apart by a distance d measured along the illumination beam, and in which the path length correcting means comprises multi-surface dichroic mirror means having first, second, and third reflecting surfaces all spaced apart by a distance d such that the image formed by the third modulator travels a distance d further than the image formed by the second modulator, which in turn travels a distance d further than the image formed by the first modulator.

24. The display apparatus of claim 23 in which the dichroic mirror means is arranged at an angle of 45° relative to the illumination beam.

25. The display apparatus of claim 24 in which the first, second and third surfaces are spaced apart by a distance $d = d/2\sqrt{2}$.

* * * * *